(12) United States Patent
Melikian

(10) Patent No.: US 8,280,764 B2
(45) Date of Patent: *Oct. 2, 2012

(54) SYSTEM AND METHOD FOR DELIVERY OF ELECTRONIC COUPONS

(75) Inventor: Simon Melikian, Westlake, OH (US)

(73) Assignee: Recognition Robotics, Inc., Elyria, OH (US)

( * ) Notice: Subject to any disclaimer, the term of this patent is extended or adjusted under 35 U.S.C. 154(b) by 437 days.

This patent is subject to a terminal disclaimer.

(21) Appl. No.: 12/572,629

(22) Filed: Oct. 2, 2009

(65) Prior Publication Data

US 2011/0082728 A1 Apr. 7, 2011

(51) Int. Cl.
*G06Q 30/00* (2012.01)
(52) U.S. Cl. .......... 705/14.1; 705/14.64; 705/14.39; 705/14.4; 705/14.55; 382/159; 382/181; 382/190; 382/199; 382/201
(58) Field of Classification Search .......... 382/209, 382/223, 100, 159, 181, 190, 201, 218, 275; 705/14.4; 345/419
See application file for complete search history.

(56) References Cited

U.S. PATENT DOCUMENTS

| | | | |
|---|---|---|---|
| 7,450,740 B2 * | 11/2008 | Shah et al. | 382/118 |
| 7,480,422 B2 | 1/2009 | Ackley et al. | |
| 2005/0044179 A1 | 2/2005 | Hunter | |
| 2007/0179918 A1 * | 8/2007 | Heisele et al. | 706/13 |
| 2008/0262929 A1 * | 10/2008 | Behr | 705/14 |
| 2011/0072047 A1 * | 3/2011 | Wang et al. | 707/776 |

OTHER PUBLICATIONS

U.S. Appl. No. 12/101,583, filed Apr. 8, 2008 and entitled "System and Method for Visual Recognition".

* cited by examiner

*Primary Examiner* — Khanh H Le
(74) *Attorney, Agent, or Firm* — Rankin, Hill & Clark LLP

(57) ABSTRACT

A method for delivering an electronic coupon to a mobile device includes receiving via a wireless network a target image or icons extracted from the target image, comparing the target image to a plurality of learned images using a processor in communication with the wireless network, determining whether the target image matches at least one learned image, and when the target image matches at least one learned image, delivering to the mobile device over the wireless network an electronic coupon associated with the at least one learned image. The target image can represent at least a portion of a front surface of a consumer packaged good located in a retail outlet. The target image can be generated using a mobile device configured to communicate with the wireless network. The front surface of the consumer packaged good is the surface of the consumer packaged good that faces an aisle of the retail outlet carrying the consumer packaged good; accordingly, the consumer does not need to handle the consumer packaged good in search of a bar code.

16 Claims, 15 Drawing Sheets

A cross section of cone like structure at two different sizes (scales)

A cross section of a "steel plate" with 3 hole of difference sizes (scale) to represent a structure in an image.

Fitting Cones into holes

Showing the distance of how far the cone structure can go inside a hole (distance "d") (corresponds to correlation)

Cone-like structure at different scale

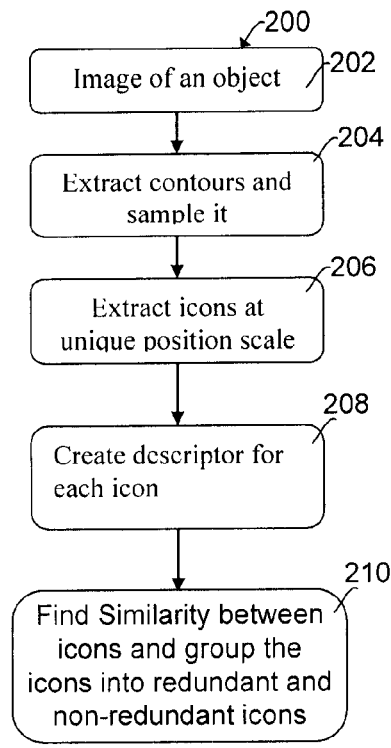
FIG. 12
FIG. 8A
FIG. 8B
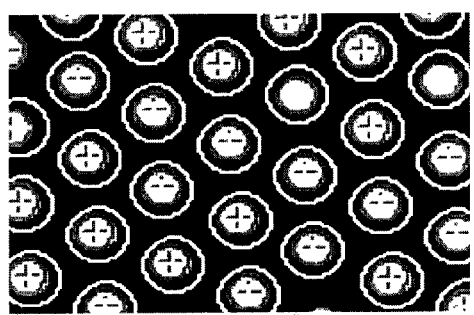
FIG. 8C

SYSTEM AND METHOD FOR DELIVERY OF ELECTRONIC COUPONS

TECHNICAL FIELD OF THE INVENTION

The present invention relates to the field of computer vision, and more particularly, to a system and method for visual recognition for use in a wide variety of applications.

DESCRIPTION OF THE RELATED ART

Computer vision generally relates to the theory and technology for building artificial systems that obtain information from images or multi-dimensional data. As used herein "information" means anything that enables a decision to be fully and/or partially based. Exemplary computer vision applications include: visual object recognition and scene interpretation, particularly for image retrieval, video indexing, controlling processes (e.g. an industrial robot or autonomous vehicle such as unmanned aerial/ground/see vehicle), detecting events (e.g. for visual surveillance), organizing information (e.g. for indexing databases of images and image sequences), Image based internet search (e.g., searching for similar image on the Internet), modeling objects or environments (e.g. medical image analysis or topographical modeling), interaction (e.g. as the input to a device for computer-human interaction), etc.

A goal of computer vision is to make a computer truly "see" just like humans do. Understanding the content of everyday images and videos is one of the fundamental challenges of computer vision. In order to make a computer "see" in an unconstrained environment an extraordinary amount of computational power, perhaps on the order of 1015 operations per second likely is needed. Even if such a speed was possible in a commercial computer vision system, it is difficult to perform rapid visual searches in unconstrained, natural environments.

To make search and recognition tasks tractable in commercial computer vision, designers typically limit the task's visual complexity. This may be done in a variety of ways. For example, the vision system may be set up to view and recognize only one or a small class of objects. Second, the presentation (position, orientation, size, view, etc.) of these objects is strictly controlled. Thus, the object variability is limited to the point that the vast majority of variables are eliminated and the search can be implemented with reasonable cost in terms of both computing time and money.

Computer vision systems generally lack the knowledge needed to constrain and interpret a general visual search (e.g., searches performed in an uncontrolled environment). Therefore, practical computer vision search requires the designer to drastically restrict what the vision system sees and to add a priori knowledge about what it will see so that it can interpret the result. Thus, a major drawback to computer vision in real world applications is the time, money and specialized knowledge needed for such applications to be adequately performed.

The evolution of computer vision in the last twenty years was driven by improvements in hardware and algorithms. A variety of computer vision methods have been developed for image detection (also referred to herein as pattern recognition). These techniques include, for example, using binary images to represent gray scale images, normalized grayscale correlation, blob analysis, geometric based search and recognition, contour based search, affine invariant constellation based recognition, corner detection, salient icon detection, scale invariant feature transform, etc.

SUMMARY

A strong need exists in the art of computer vision to recognize objects in an image or image sequence similar to vision in human beings. For example, in an airport, an unmanned vehicle needs to recognize other vehicles and obstacles so it can avoid and/or maneuver through the airport. In an unmanned vehicle or other robotic vision application, the robotic application generally needs to "see" the pathway and navigate autonomously or land autonomously.

In visual recognition, achieving invariance to object presentation (position, orientation, distance (scale), and perspective), lighting, occlusion and background is challenging. Aspects of the present invention provide excellent invariance to object presentation, lighting, occlusion and background and generalization for true object recognition.

The human brain processes visual information associated with objects with full independency of the position, orientation, distance (scale), and perspective. For example, if a human being views a "soda pop can", the human can recognize it regardless of the distance and/or orientation (e.g., distance from can, rotation, tipped, tilted, etc.). The brain essentially "normalizes the view". Humans are capable of learning a large number of objects and easily retrieve the learned objects. Aspects of the present invention allow learning virtually an unlimited number of objects and recognizing any one of these learned object(s) regardless of object presentation. This is analogous to human visual recognition capability. For example, aspects of the invention enables the recognition of hundreds of trained objects very quickly (e.g., in less than a second) and fundamentally has no limit in learning and recognizing millions of objects. This capability stems from the ability to extract the same icons (image patches) from an image of an object regardless of distance, rotation, presentation that the object is in relation to the viewer and/or the device acquiring the image or series of images.

Aspects of the invention relate to extracting unique points (e.g., x and y coordinate points) in an image. Each one of these unique points has its own unique scale (e.g., size) and orientation that is related directly to the presentation of the object. Having scale and orientation information measured per unique point enables visual recognition that is fully invariant to presentation. In other words, when an object is closer, farther, rotated, tipped, and/or tilted, these unique points have similar relative locations to the object and a unique scale that is related to how close/far the object is and rotation values that are related directly to the object planar rotation. Basically these unique points "normalize the view" of the object.

An icon (image patch) from an image of an object is extracted from each of these unique points. The size of the icon corresponds to the scale of the unique point. And the angle of the icon is the angle of the unique point. After extraction of the various icons, an object becomes a collection of icons. Each of these icons is un-rotated by icon angle and resized to a constant size so it can be compared (distance measure such as absolute difference) one-to-one with other icon (also referred to herein as "normalized". It has been determined that the icons are virtually identical regardless of object presentation. In other words, the icons (image patches) are the same whether the object is close or far, rotated, tilted, and/or tipped. One of the unique properties of these icons is their stability over scale and angle. Comparing an icon for similarity may also include color information. Generally, when comparing two icons, each icon may also be intensity-normalized.

Searching for an object in database of learned object's images becomes a search of vectors associated with learned object's images. Indexing techniques are one way represent an image for searching.

Computing geometric transformation between a learned object and a found object is done by computing the transformation between the corresponding learned icon's position and found icon's position, as discussed below. The transformation matrix between learned object and found object is computed using a perspective matrix using least square of all corresponding icons positions or by picking two sets of quad icons position from the learned and found objects. Based on rigid body assumptions, every set of four icons can compute a perspective matrix. Many sets of four icons give the same transformation, which provides a robust measure of correct match, also referred to herein as, measure redundancy, as discussed below.

One aspect of the present invention relates to a method for visual recognition of at least one object in an image, the method comprising: providing an image in an electronic format, wherein the image includes at least one object to be learned; generating extremum information associated with the image by cross-correlating at least one structure across at least a portion of the image, wherein the extremum information includes at least one coordinate point associated with cross-correlating the at least one structure across the image; extracting at least one icon from the image, wherein the icon includes the coordinate point associated with the extremum information; determining an angle associated with the at least one icon; normalizing the icon to a fixed size; and storing icon information in a computer readable form, wherein the icon information includes image values associated with at least a portion of the icon; the at least one coordinate point associated with the extremum information; and the angle associated with the at least one icon.

Another aspect of the invention relates to a method for matching a learned object with a target object, the method comprising: providing at least one learned object and at least one target object, wherein the learned object and the target object; extracting unique points from the target object, wherein the unique points are generated from extremum information obtained from the target image by cross-correlating at least one structure across the target image; extracting an icon of the target image corresponding to each of the unique points; determining an angle associated with the at least one icon; normalizing the extracted icon; and determining if the extracted icon from the target images matches a learned object.

Another aspect of the invention relates to a program stored on a machine readable medium, the program being suitable for use in matching a learned object with a target object, wherein when the program is loaded in memory of an associated computer and executed, causes extracting unique points from the target object, wherein the unique points are generated from extremum information obtained from the target image by cross-correlating at least one structure across the target image; extracting an icon of the target image corresponding to each of the unique points; determining an angle associated with the at least one icon; normalizing the extracted icon; and determining if the extracted icon from the target images matches the learned object.

An example of a method for delivering an electronic coupon to a mobile device includes receiving via a wireless network a target image or icons extracted from the target image, comparing the target image to a plurality of learned images using a processor in communication with the wireless network, determining whether the target image matches at least one learned image, and when the target image matches at least one learned image, delivering to the mobile device over the wireless network an electronic coupon associated with the at least one learned image. The target image can represent at least a portion of a front surface of a consumer packaged good located in a retail outlet. The target image can be generated using a mobile device configured to communicate with the wireless network. The front surface of the consumer packaged good is the surface of the consumer packaged good that faces an aisle of the retail outlet carrying the consumer packaged good; accordingly, the consumer does not need to handle the consumer packaged good in search of a bar code.

Another method for delivering an electronic coupon to a mobile device can include extracting a plurality of icons from a target image, comparing an extracted icon to a stored icon corresponding to a learned image, determining whether the target image matches the learned image, and delivering to the mobile device over the wireless network an electronic coupon associated with the learned image. The target image can be of a consumer packaged good and can be generated by a mobile device configured to communicate with a wireless network. The stored icon can be stored in a memory that is in electrical communication with the wireless network. The electronic coupon can be delivered to the mobile device over the wireless network when the target image matches the learned image.

Other systems, devices, methods, features, and advantages of the present invention will be or become apparent to one having ordinary skill in the art upon examination of the following drawings and detailed description. It is intended that all such additional systems, methods, features, and advantages be included within this description, be within the scope of the present invention, and be protected by the accompanying claims.

It should be emphasized that the term "comprise/comprising" when used in this specification is taken to specify the presence of stated features, integers, steps or components but does not preclude the presence or addition of one or more other features, integer, steps, components or groups thereof.

BRIEF DESCRIPTION OF THE DRAWINGS

The foregoing and other embodiments of the invention are hereinafter discussed with reference to the drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

FIGS. 8A-8C illustrate exemplary structures in accordance with aspects of the present invention.

FIG. 9-13 are exemplary methods in accordance with aspects of the present invention.

DETAILED DESCRIPTION OF EMBODIMENTS

Figure 1A:
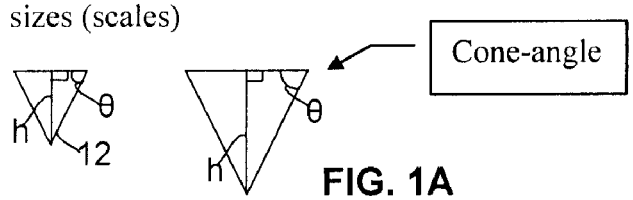
FIGS. 1A-1D is an exemplary illustration of a structure and correlation method in accordance with aspects of the present invention.

The present invention is directed to a system and method for pattern identification of a learned image (or learned pattern) in a target image. Unique and stable points (e.g., x and y coordinate points) are extracted from an image of an object, regardless of object presentation. The uniqueness of the extracted points comes from the fact that these points have the same relative position in the object regardless of distance, orientation (e.g., tip, tilt, rotation, etc.) and illumination of the object from the viewer or viewing device. In other words, the extracted points are invariant to object presentation.

Early computer vision algorithms generally used an image subtraction method (also referred to as golden template matching) as a primitive method of recognition. Image subtraction is a form of distance measure between two images. For the image subtraction method to work, the object in the learned image has to be nearly identical to the object in the target (scene) image. For example, the object generally has to be in the same position, same scale, same planar angle, etc. as the learned object. Any shift in location or other transformations would produce a false result. Such conditions were generally needed because the subtraction method simply subtracted pixel values having coordinates in one image with pixel values located at corresponding coordinates in another image.

If a method can find regions in an object image that are the same regardless of object presentation, it is conceivable that the golden template concept may be used to recognize regions of that object, which could result in recognizing the entire object. Prior methods to find these unique points and associated icons produced either unstable points in position, unstable scale, and/or unstable angle. The prior methods produced few inliers and majority of outliers, which makes pattern recognition generally problematic. Researchers in academia have experimented with several types of these unique points. Example of some of the famous type of these points are, Harris-Corner-Detector, Harris-Laplace, Laplacian-of-Gaussian, SIFT (Difference of Gaussian). Generally these detectors lack stability in position, scale and angle, which produces various problems during the recognition process. For example, these prior methods produce hundreds and/or thousands of unique points and only a handful of such points may survive from one object position to another to aid in pattern recognition.

An invariant point in an image generally needs to have the characteristic of extremum for some metric. For example, in a one dimensional signal, such as a parabola, the peak point of a parabola is an invariant point regardless to the parabola's parameters (e.g., regardless to how wide, narrow, shifted, or rotated a parabola is).

Referring to FIGS. 1A-1D, an exemplary method 10 of extracting unique and highly stable points (e.g., x and y coordinate points) is illustrated. These points are highly stable in position, scale, and angle. Accordingly, such points are referred to herein as scale rotation invariant (SRI) points (and/or SRIP). One way of extracting the SRI points is by cross correlating the object image by a structure 12. Cross-correlation is generally a measure of the similarity of two signals. Cross-correlation is commonly used to find features in an unknown signal by comparing it to a known one. It is a function of the relative time between the signals and is sometimes called the sliding dot product.

Structure 12 may be circular, conic or Gaussian shape. In one embodiment, the structure 12 is a cone-like structure. Referring to FIG. 1A, the cone-like structure 12 is illustrated in two dimensions.

The cone-like structure 12 has a cone angle θ that generally corresponds to the height (h) of the structure 12. For example, SRI points generally have very interesting properties that aid in recognition. Based on correlation score between cone-like structure (or any other desired structure) and the image: a correlation score close to 1.0 identifies round structures; a correlation score of about 0.5 identifies strip like structures; and a correlation score of about 0.7 identifies an end of strip like structure. One of ordinary skill in the art will readily appreciate that the shape of the structure chosen may correspond to a change in correlation score for the identified structure.

Figure 1B:
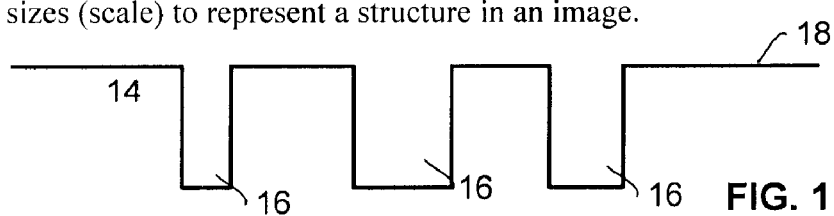

Referring to FIG. 1B, a "steel plate" 14 is illustrated. The steel plate 14 has holes 16 of varying sizes along a surface 18, The steel plate is analogous to the object image or scene image.

Figure 1C:
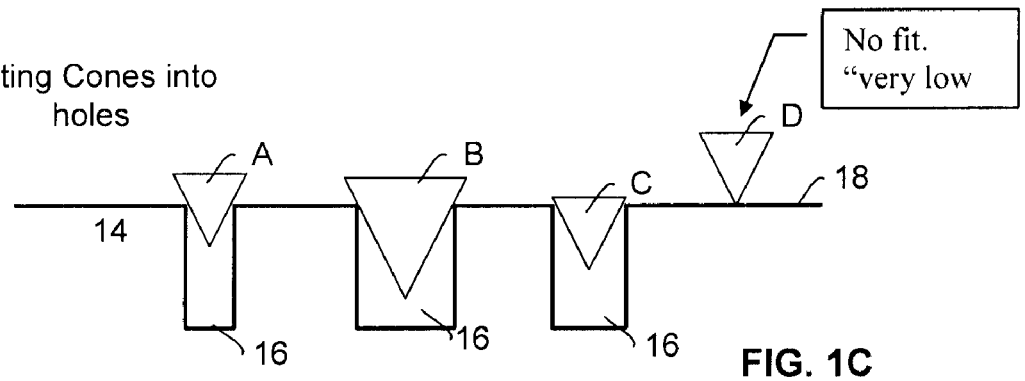
Figure 1D:
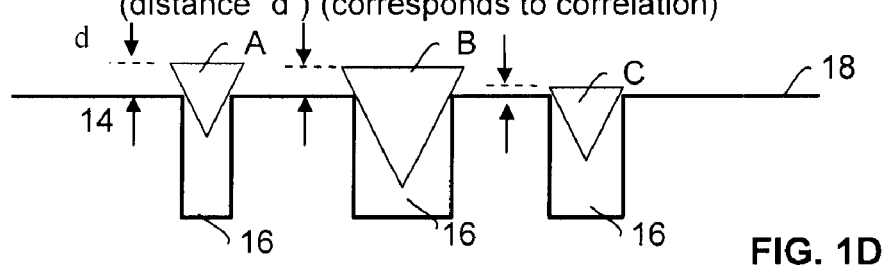

The structure 12 is attempted to be "inserted" into the steel plate 14 in a scanned manner (e.g., one pixel after another pixel). As shown in FIG. 1C, the cone-like structure 12 is illustrated being inserted into a "steel plate" 14, for purposes of illustration. One goal is to find holes (or other meaningful structure) by poking (in a scanned way) (i.e., pixel by pixel and/or group of pixels by group of pixels) the structure 12 (e.g., a cone-shape pin) into the steel plate. The structure 12 (e.g., the cone-like shape is the known cross-correlation image) is used to generate the unique points. If a point on the surface 18 does not contain a hole, the pin does not go into the steel plate 14, which yields a low score correlation match (e.g., see "D" in FIG. 1C). Referring to FIG. 1D, if structure 12 is inserted (or poked) into a hole, the cone would go in some distance depending on the pin conic size and hole size in the plate. For example at "A", the structure 12 extends into the hole 16 approximately half-way. At "C", the structure 12, which is substantially the same size as the structure at "A", extends almost fully into the hole. Accordingly, "C" has a higher correlation than "A". Also, note that at "B", a larger structure 12 than was used at "A" and "C" is illustrated. The larger structure extends approximately 80% into the hole 16, at "B". If the same sized structure used at "A" and "C" were inserted into the hole at "B", the structure would hit the bottom without touching any of the walls associated with the hole 16 and, therefore, not have a strong correlation, no extremum. In one embodiment, it is desirable to cross-correlate an image with structures having a variety of scales in order to identify all or at least a portion of the extremum information available on the image.

Referring to FIG. 1D, the amount that the cone goes inside (e.g., correlation match score) is related to the structure, cone-angle, and the size of the hole, or the structure. For example, this can be view as a two dimensional frequency analysis of an image. The result of cross correlating a cone structure with the image at a different scale is a set of coordinate points (x,y) and unique radius (scale) for each of these points. The radius value is directly related to the scale of the image and to the size of the structure around the coordinate point.

Figure 2:
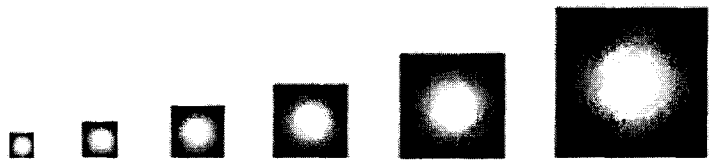
FIG. 2 is an exemplary illustration of a structure having various scales in accordance with aspect of the present invention.

FIG. 2 illustrates the cone-like structure 12 in a two-dimensional image for six different scales. The scale size may be any desirable size for each of the various structures used to identify the SRI points. The SRI points for each of the various structure sizes will generally vary when cross-correlated with an image. The collection of SRI points for all of the structure sizes is generally used to define the object, as discussed below. For example, the scale size of the structure 12 may vary from a point contact (e.g., 5×5 pixel) to the size of the image and/or object of interest. The gradations in color change correspond to the height of the cone-like structure 12.

FIGS. 3A-3G illustrate an exemplary image that has been cross-correlated with a structure 12 of varying cone size (scale) (e.g., cone-like structures illustrated in FIGS. 1 and 2). The exemplary image may be any digital image, a portion of an object or image, an electronic representation of an image, etc. As shown, in FIGS. 3A-3G, the image is a digital image of an object. It may be desirable for a machine to determine the precise location and/or orientation of one or more items (or patterns) in this scene. This information may be used in any desirable manner. For example, the information may be used so that a controller, a device, or other electronic device may properly interact with software that is capable of detecting optical objects in order to facilitate controlling, locating, assembling and/or processing information related to the item.

Once the image has been cross-correlated, a resulting set of unique points (also referred to herein as x and y coordinate points) and radius values (scale) for each of the points are obtained, as is illustrated by the white circles in each of the images. As stated above, any structure 12 may be used in accordance with aspects of the present invention. For example, a two dimensional Gaussian provided similar results as the cone-like structure. The cone-like structure 12 is utilized to find extremum in the object regardless of scale. This provides robust and reliable relative localization (e.g., x and y coordinate positions in the image), and scale.

Figure 3A:
FIGS. 3A-3N illustrate correlation results and corresponding extremum information associated therewith in accordance with aspects of the present invention.
Figure 3H:
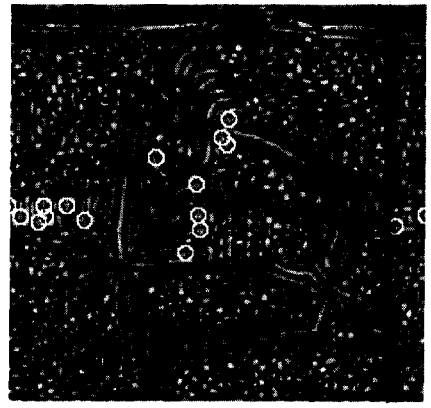
Figure 3B:
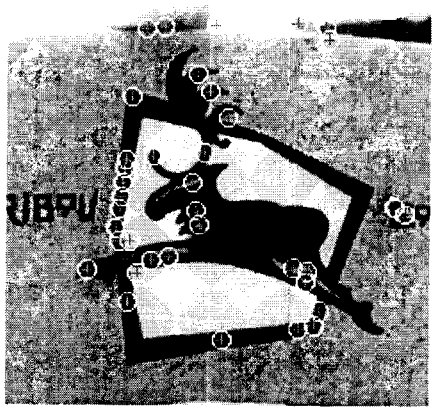
Figure 3I:
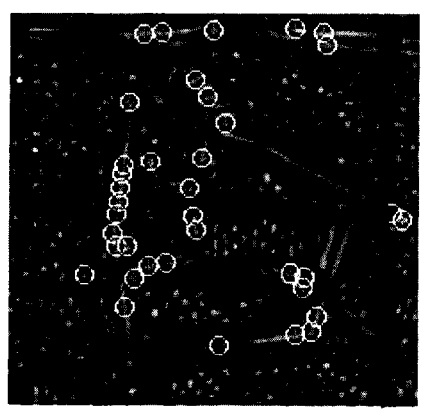
Figure 3C:
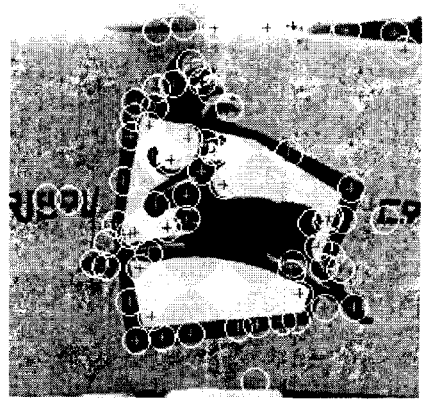
Figure 3J:
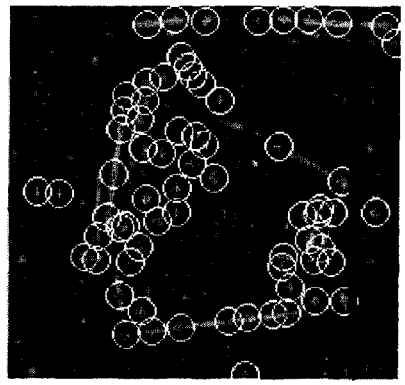
Figure 3D:
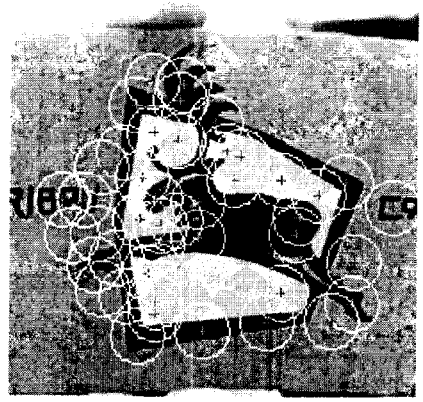
Figure 3K:
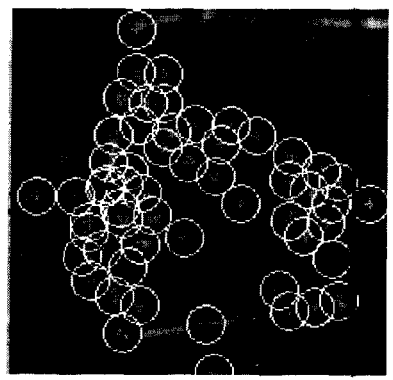
Figure 3E:
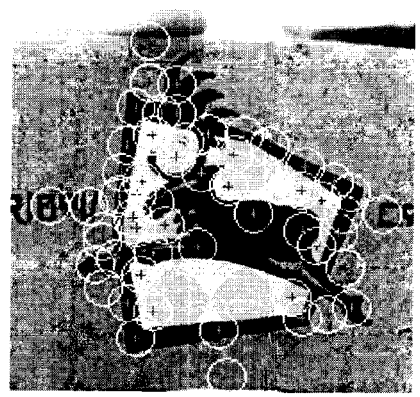
Figure 3L:
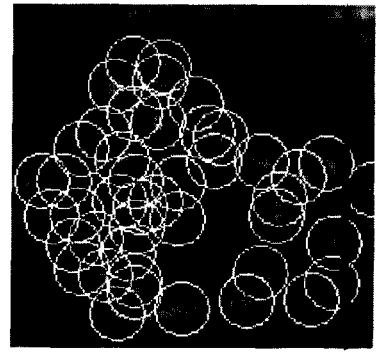
Figure 3F:
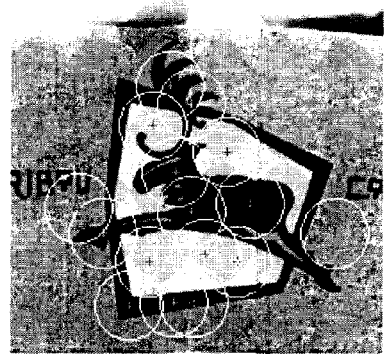
Figure 3M:
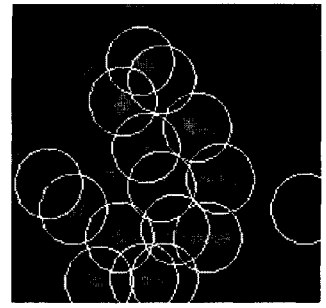
Figure 3G:
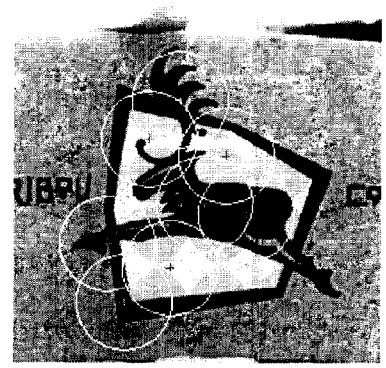
Figure 3N:
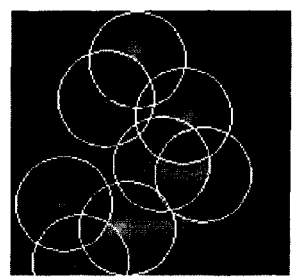

Once the correlation image is computed a peak detector is applied to find the coordinate of peaks in sub pixel form, as illustrated in FIGS. 3H-N. FIG. 3H identifies the extremum corresponding to FIG. 3A; FIG. 3I identifies the extremum corresponding to FIG. 3B; FIG. 3J identifies the extremum corresponding to FIG. 3C; FIG. 3K identifies the extremum corresponding to FIG. 3E; FIG. 3L identifies the extremum corresponding to FIG. 3D; FIG. 3M identifies the extremum corresponding to FIG. 3F; and FIG. 3N identifies the extremum corresponding to FIG. 3G. The cone-like structure 12 is a rotational invariant extremum detector for range of scales. In addition, the cone-like structure 12 also offers superior position localization regardless of scale.

Figure 4A:
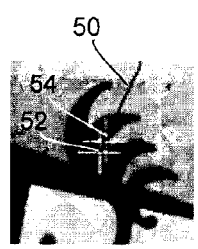
FIGS. 4A and 4B illustrate icon angle vectors in accordance with aspects of the present invention.
Figure 4B:
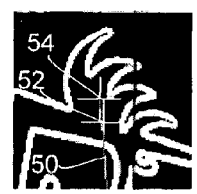

Once the unique points (e.g., coordinate values) are determined, an icon (image patch) is extracted from the associated at each of these coordinates. The icon size is proportional to the radius (scale) of the cone structure having a high cross-correlation match value. The angle of the icon 50 is computed from a vector between the unique point position 54 and the grayscale centroid position 52 of the icon at scale, as shown in FIGS. 4A and 4B. As shown in FIG. 4A, icon angle computation is based on the gray scale centroid using the raw image of the icon, for example. Icon angle computation may also be based on the edge detected image of the icon, as shown in FIG. 4B. The angle of the icon is the vector from the center of icon to the grayscale centroid. The grayscale centroid can also be applied on the raw image (e.g., such as Sobel or Canny edge detection).

Figure 5:
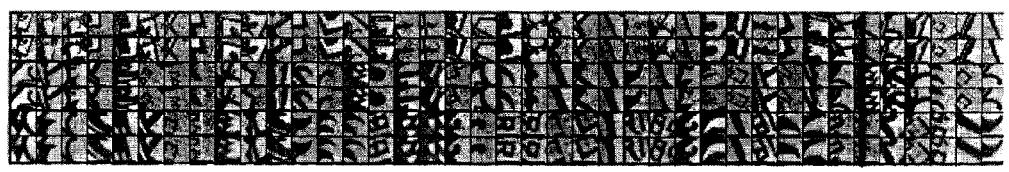
FIG. 5 is an exemplary illustration of normalized icons obtained in accordance with aspects of the present invention.
Figure 6A:
FIGS. 6A and 6B illustrate exemplary icons in accordance with aspects of the present invention.

Once extracted, each one of the icons is normalized to a fixed size, as shown in FIG. 5. FIG. 5 illustrates the set of icons extracted from the image at each coordinate point for each scale associated with the structure. For example, FIG. 5 illustrates a matrix of normalized icons. The purpose of normalizing these icons into constant size is to be able to compare them with other icons (for the purpose of finding similar icons in database of icons, thus similar objects), by simply computing the difference between the two images as in the "golden template matching". Another method to compare these icons is by creating descriptor vector and then comparing these descriptors using distance measure between vectors. For example, the icon of FIG. 6A may be described in descriptor vector format as:

6, 17, 22, 23, 16, 0, 0, 11, 3, 26, 25, 3, 0, 0, 20, 20, 6, 5, 4, 10, 5, 60, 0, 7, 6, 14, 4, 12, 9, 22, 12, 16.

Figure 6B:
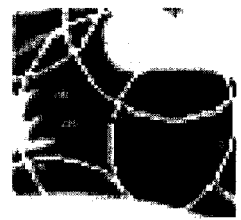

Likewise, the icon of FIG. 6B may be described in descriptor vector format as:

13, 7, 21, 11, 4, 5, 24, 11, 0, 58, 38, 0, 0, 0, 2, 0, 0, 5, 20, 11, 4, 28, 28, 1, 7, 6, 0, 0, 0, 84, 1, 0.

One of ordinary skill in the art will readily appreciate that there are many ways to compute icon descriptors (e.g., histogram of gradient angle, principle component analyses (PCA), etc.).

Figure 7A:
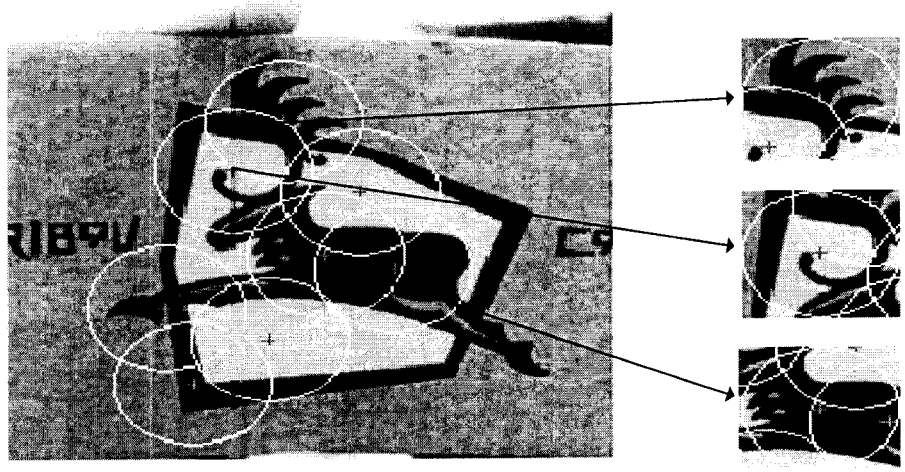
FIGS. 7A-7C illustrate exemplary icons in accordance with aspects of the present invention.
Figure 7B:
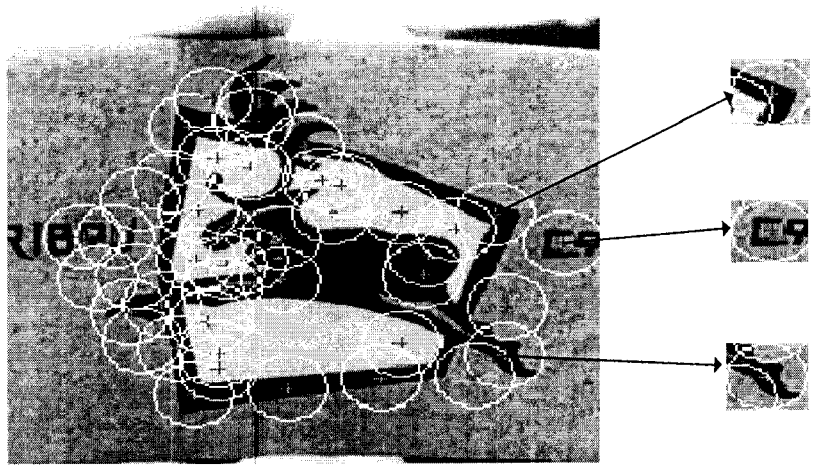
Figure 7C:
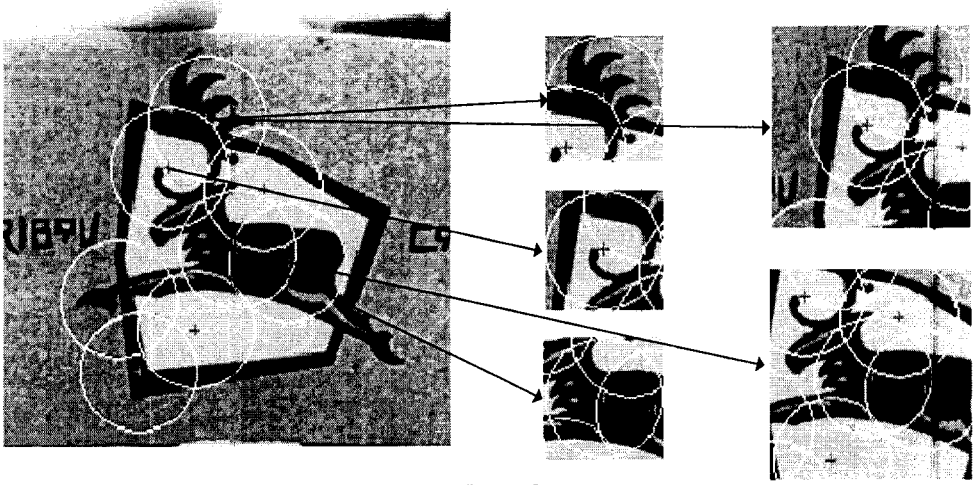

Each learned object may be described by a set of icons. Each icon generally includes one or more values, for example: (x,y) coordinate position, a size that correspond to the size of the image structure from which the icon originated from, and an angle. For example, FIGS. 7A-7C illustrates various icons extracted from a correlation of structures having various sizes. The spatial relation of these icons is insured by the outline of the object. These icons may be stored in any electronic storage device. For example, the icons may be stored in a database of icons that generally includes an identifier, which is tagged and/or otherwise associated to a specific learned object. In another embodiment, a descriptor associated with each of the icons is stored in a database or other suitable data storage medium. In another embodiment, icons may also be extracted at multiple-scale values that produce multiple icons per unique points, as opposed to extracting icons only at the cone-structure-scale. For example, if the cone-structure scale is 32×32 pixels, then extract icons at 32×32 pixels and 48×48 pixels, as illustrated in FIG. 7C. This method generally guarantees true correspondence and recognition from a very few number of icons. In fact, in many situations only one unique icon may be needed to determine recognition of the object.

FIGS. 8A-8C illustrate one process of extracting unique points from an image. In FIG. 8A, unique points are extracted along a strip like region with correlation score of about 0.5. FIG. 8B illustrates the end of a strip and has a correlation score of about 0.7. FIG. 8C illustrates many round objects being extracted. The correlation score with the round objects is approximately 1, indicating that the round objects highly correlate with the structure (e.g., the cone-like structure) selected for cross-correlating.

Figure 9:
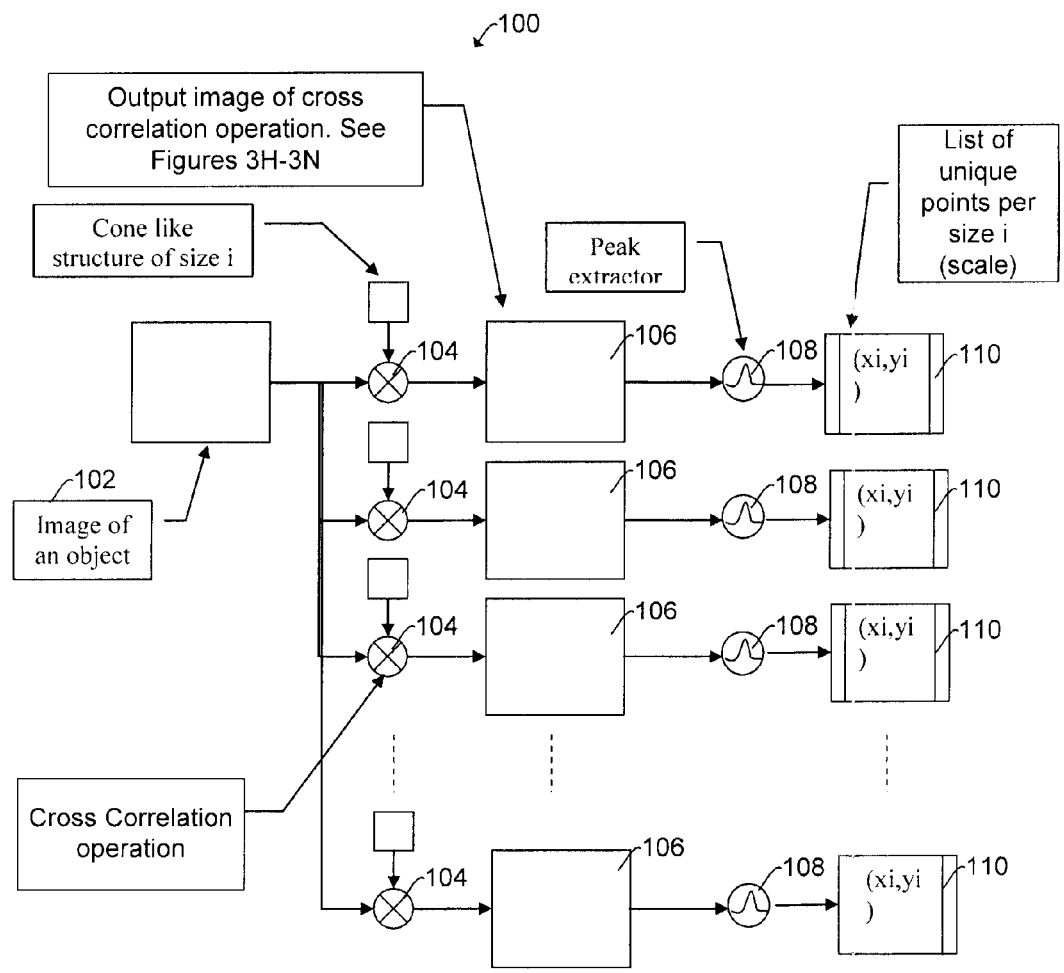

FIG. 9 illustrates one exemplary method 100 for extracting scale and rotation invariant icons from an image. At block 102, an image of an object is provided in electronic form. The image may be in any suitable electronic format (e.g. JPEG, TIFF, PDF, bitmap, etc.) At block 104, the image of an object is cross-correlated with one or more structures 12 (e.g., cone-like structures), as described above. At block 106, output image of cross-correlation operation is obtained for each of the cross-correlation structures. At block 108, peak values are extracted for each of the cross-correlation structures. At block 110, a list of coordinate points per cross-correlation structure is obtained and stored in a memory.

Figure 10:
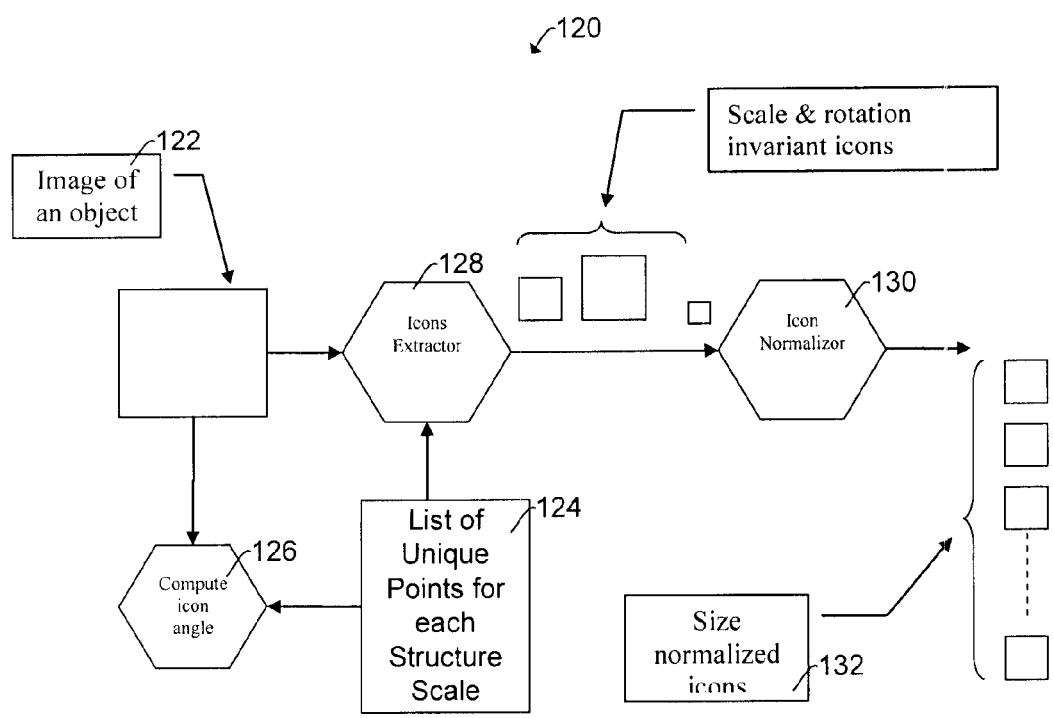

FIG. 10 illustrates one exemplary method 120 for extracting scale and rotation invariant icons from an image. At block 122, an image of an object is provided in electronic form. At block 124, the list of coordinate point per cross-correlation structure is provided. At block 126, the icon angle is generated for each of the icons and stored appropriately for later use at block 128. At block 130, the icons are then normalized by appropriate scaling, as desired. At block 132, the icons are stored in a memory or other electronic storage device.

Figure 11:
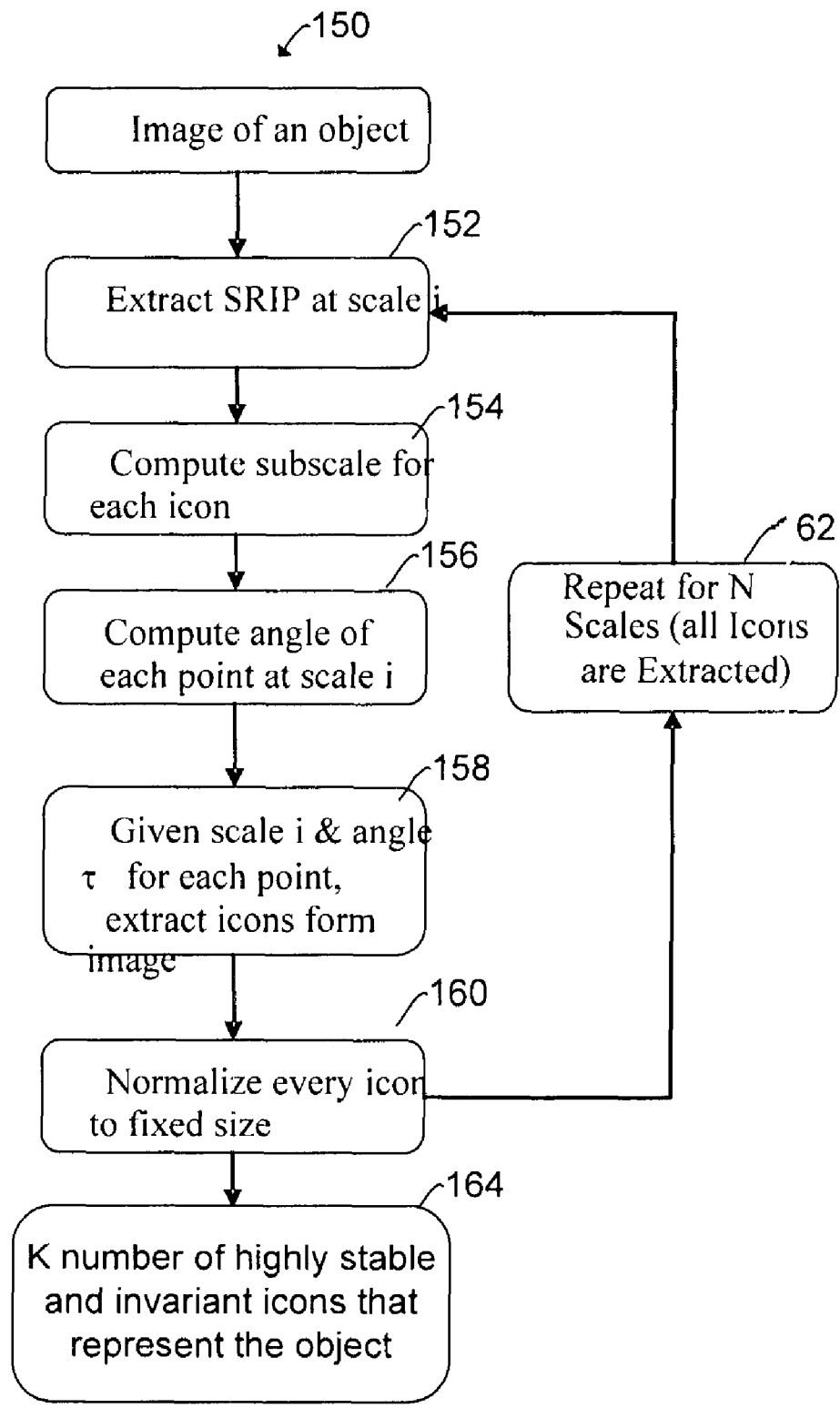

FIG. 11 illustrates another exemplary method 150 for extracting scale and rotation invariant icons from an image. At block 152, an image of an object is provided in electronic form. At block 154, scale rotation invariant points are extracted at a scale. At block 156, a subscale is computed for each icon. An extremum point is usually a peak at a scale and neighboring scales. Therefore, it is possible to compute subscale by taking the peak value at "best scale" and its neighboring scale. The scale of an icon becomes the scale of the cone-like structure plus or minus subscale. A well known method is parabola fit to find its peak in sub-position.

At block 158, the icon for each for each of the coordinates is computed for the scale. At block 160, given the icon angle and scale for each of the coordinates, extract icons from the image. At block 162, the icons are normalized to a fixed size. At block blocks 154 through 160 are repeated until all icons have been extracted. At block 164, a constant (K) of highly stable and invariant icons that represent the object are obtained and may be stored in a memory or other suitable storage device or pumped into an indexing data base or hash table.

An exemplary method 200 for learning an object is illustrated in FIG. 12. At block 202, an image of an object is provided in electronic form. At block 204, an object contour point is extracted from an image of and sampled. The contours points may be used for hypotheses verification and to verify spatial relation between coordinates of unique points. In general, the unique points drive the attention and contour points verify the hypotheses. Sample points from the contour points are selected, which provides a fast verification process.

At block 206, SRI points acquired from the image and/or object to be learned are used to extract icons associated with the SRI points. In one embodiment, each icon has its (x, y) coordinate, size (scale) and angle. At block 208, a descriptor for each icon is created. In addition or in the alternative, each icon may also be tagged or otherwise associated with a learned object name.

At block 210, similar icons are found and tagged. Similar icons are generally suitable for recognition, but not unique enough for locating the object unless the spatial relation between the icons is applied such as, for example, nearest neighbor icon; n nearest neighbors; left, top, bottom, left neighbor; etc. Similar icons may have multiple correspondences. Blocks 202-210 are repeated for every object needed to be learned. Once learned, an object becomes a collection of icons (or their descriptors) and the spatial relation that ties the icons together is a set of object contour points. The icon coordinates also can be used for detecting, determining and/or verifying special relationships between the icons.

Using descriptors provides a variety of advantages. Such advantages include, for example, permitting the use of indexing techniques for fast retrieval of similar icons in a database of icons, which hastens retrieval of similar objects. This functionality is highly desirable when recognizing an object(s) from a large database of objects.

Figure 13:
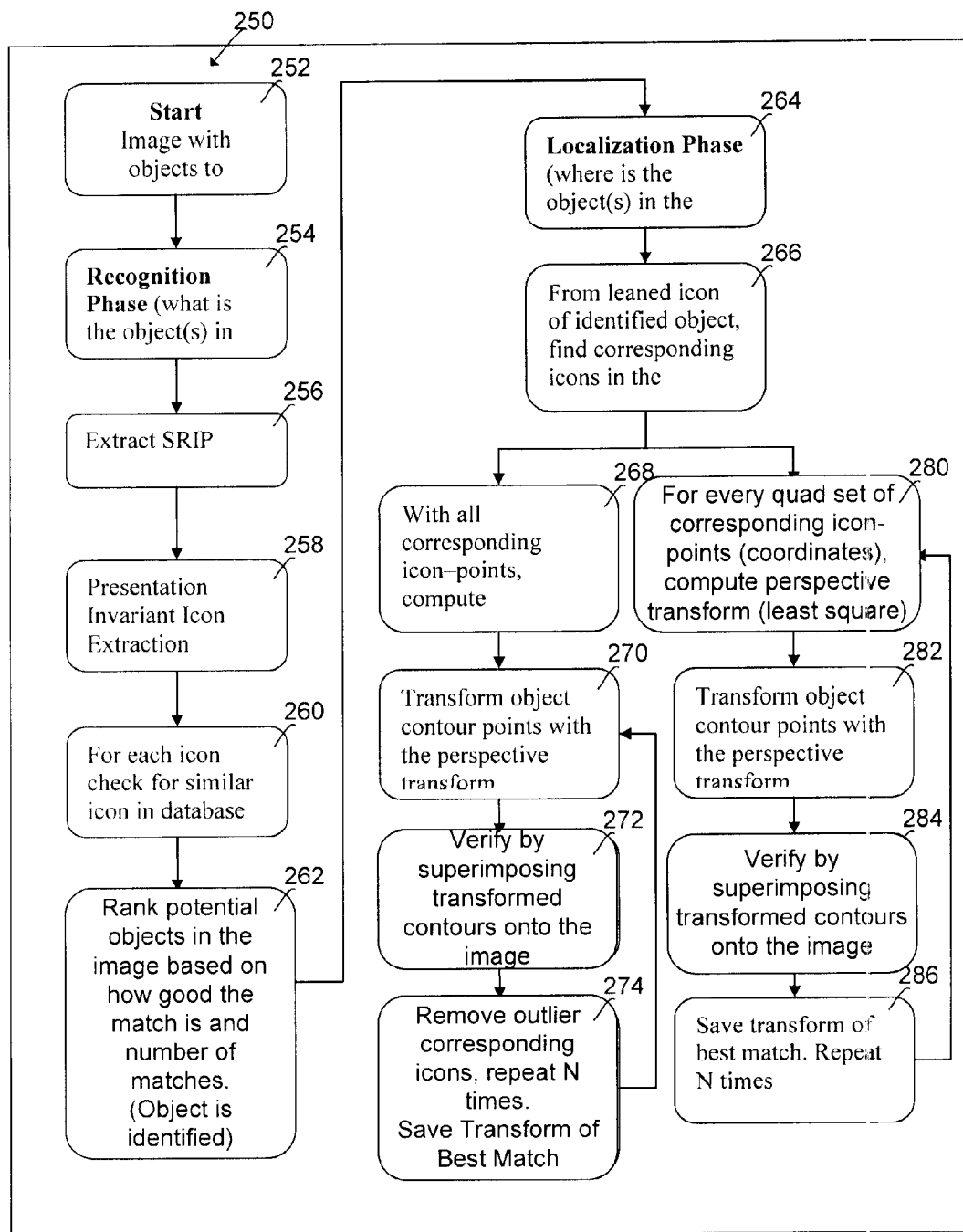

During the recognition phase, an object or multiple objects may exist in an image (scene image) and one goal is to recognize the object or multiple objects and provide the x and y coordinates of each object. An exemplary recognition method 250 is illustrated in FIG. 13. At block 252, an image having one or more objects to identify is provided in electronic form. At block 254, the recognition phase is initialized. At block 256, contour points are extracted from the image and SRI points are extracted from the image. At block 258, icons of the image are extracted at each of the unique points and normalized, as set described above. At block 260, for each extracted icon, a best matched icon is found or otherwise searched for in a database of icons using either a sequential method if number of learned object is small or an indexing method if the number of learned object is large.

At block 262, candidate objects in the image are identified and ranked based on the quality of the match and/or the number of matches. At block 264, the location of the object or objects is determined. At block 266, based on the learned icon or icons of an identified object or objects, corresponding icons in the recognized icons are found. This may be accomplished by a variety of methods.

One exemplary method begins at block 268. At block 268, all corresponding icons are used to compute a perspective transformation. This may be done by generating one or more hypotheses. The hypotheses may be generated in any desired manner. For example, all icons of learned object(s) may be selected, and compared with corresponding matched icons. Using a least square method correlation method or another correlation method, a perspective transform is generated between the learned unique point's coordinates and the corresponding matched points in the scene image. A least squares correlation method is generally preferred because there may be some outliers, at this juncture.

At block 270, the sampled learned contour points of candidate objects are transformed and superimposed on the scene image for verification. A match score between sampled contour and scene contour is computed. The transformation having the best contour match is selected. At block 272, using the transformation of the best match, all unique points of the learned object are transformed with the perspective transform onto the image. In addition, the distance between these transformed points and scene object unique points are computed. At block 274, any outlier corresponding icons are removed and the transform having the best match is saved for later use. Blocks 270 through 274 are repeated N times, where N is the number of corresponding icon points. Once this method has been applied N times, the transform having the best match is saved for later use.

Another method for obtaining precise localization of an icon is illustrated in blocks 280-286. Referring to block 280, for every quad set of corresponding icons points (e.g., coordinates), a perspective transform is computed using least squares or some other correlation method. At block 282, the object contour points with the perspective transform is transformed, in similar manner as block 270. At block 284, transformed contour points are transformed and superimposed onto the image to verify the transform, as discussed above with respect to block 272. At block 286, the transform producing the best match is saved and the process repeats N times (where N is the number of quad sets).

Figure 14A:
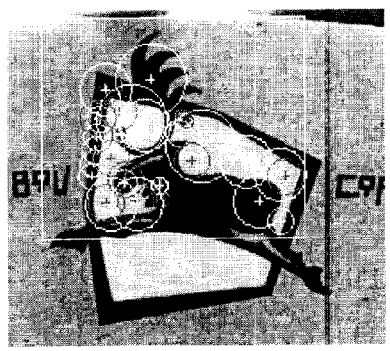
FIGS. 14A-B illustrate exemplary objects having different scales and orientations in accordance with aspects of the present invention.
Figure 14B:

FIGS. 14A and 14B illustrate samples of unique points that are invariant to presentation. For example, FIG. 14A illustrates an object in an image, wherein the image was taken at a relatively close distance to the object and/or the image has been zoomed in around the object. FIG. 14B illustrates an image of the same object taken at a further distance and/or zoomed further out, and rotated, tipped and tilted than the image in FIG. 14A.

In operation, a method of generating the hypotheses picks a predetermined number of points (e.g., four points) of the leaned unique points and a predetermined number of corresponding points (e.g., four points) in the scene image. The process is repeated for N number of quad points. For every set of four points the perceptive transform is generated and sampled contour points are transformed and superimposed on the scene contour points. The transform of highest match between learned contours and scene contour is kept as the best transformation transform. For a set of ten matching icons between learned object and found object, there are 210 possible combination and, of course, 210 possible hypotheses generation and verifications. The speed of the recognition process (the entire process) for one learned object is about 140 millisecond using standard off the shelf Pentium based processor with 1.6 GHz processor speed. It is approximately 2 milliseconds extra for every learned object using sequential icon matching. This means, for example, that for 430 learned objects, a recognition would take 1 second ((1000−140)/2). A hash table based indexing would have the potential of achieving recognition of a million objects in one second.

As a practical contribution, the aspects of the present invention may be used in a wide variety of application including, for example, Exemplary computer vision applications include: visual object recognition and scene interpretation, particularly for image retrieval, video indexing, controlling processes (e.g. an industrial robot or autonomous vehicle such as unmanned aerial/ground/see vehicle), detecting events (e.g. for visual surveillance), organizing information (e.g. for indexing databases of images and image sequences), Image based internet search (e.g., searching for similar image on the Internet), modeling objects or environments (e.g. medical image analysis or topographical modeling), interaction (e.g. as the input to a device for computer-human interaction), applications wherein a closed-loop guidance and/or control system is utilized that requires a fast searching algorithm, etc.

Figure 15:
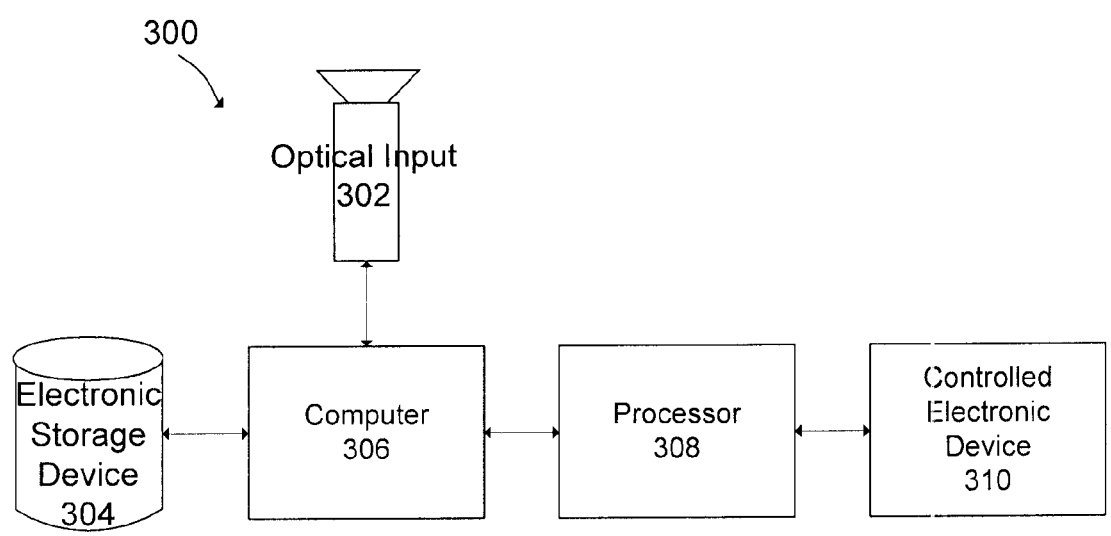
FIG. 15 is a block diagram of a system in accordance with aspects of the present invention.

FIG. 15 illustrates an exemplary feedback system 300 that may be used in accordance with the aspects of the present invention. The system 300 may include an optical input device 302 (e.g., a CCD camera) and/or an electronic storage device 304 for providing a learned image and/or a target image to a processor 306. The output of the devices 302, 304 may be input to a processor 306 that has computer code that is functional to carry out the desired functionality. The processor 306 may generate a control signal to a controller 308 (e.g., programmable logic controller) that may be used to control one or more electronic devices 310 (e.g., vehicle navigation system, tracking system, etc.). A feedback signal may be generated by the electronic device 310 to the controller 308 and/or processor 306 in order to control the particular application in which the invention is being applied.

The methods and systems for recognizing target objects can be useful in delivering coupons or other advertisement offers to consumers near the point of sale. For example, with reference to FIG. 16, a consumer can generate a target image of a consumer packaged good 400 using a mobile device, e.g. a wireless phone 402 that includes a processor 404 (FIG. 18) and a camera, that communicates with a server 408, which also includes a processor 410, via a wireless network 412 to receive a coupon, which can be an electronic coupon 414 (FIG. 17) that is relevant to the consumer packaged good (or a complementary consumer packaged good).

Figure 18:
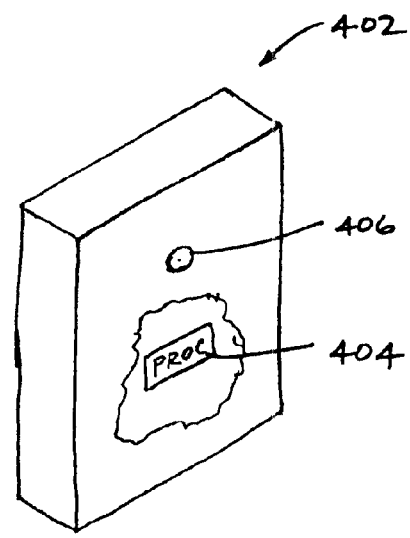
FIG. 18 is a rear perspective view with portions broken away schematically depicting internal components of the mobile device depicted in FIG. 17.

The mobile device 402 can be any conventional wireless phone that includes a processor (or similar processing device) and a camera, only the lens 406 of which being visible in FIG. 18. The network connecting the wireless phone 402 to the server 408 need not be entirely devoid of wires. The wireless network 412 can be encompassed within the network connecting the mobile device 402 to the server 408.

Figure 19:
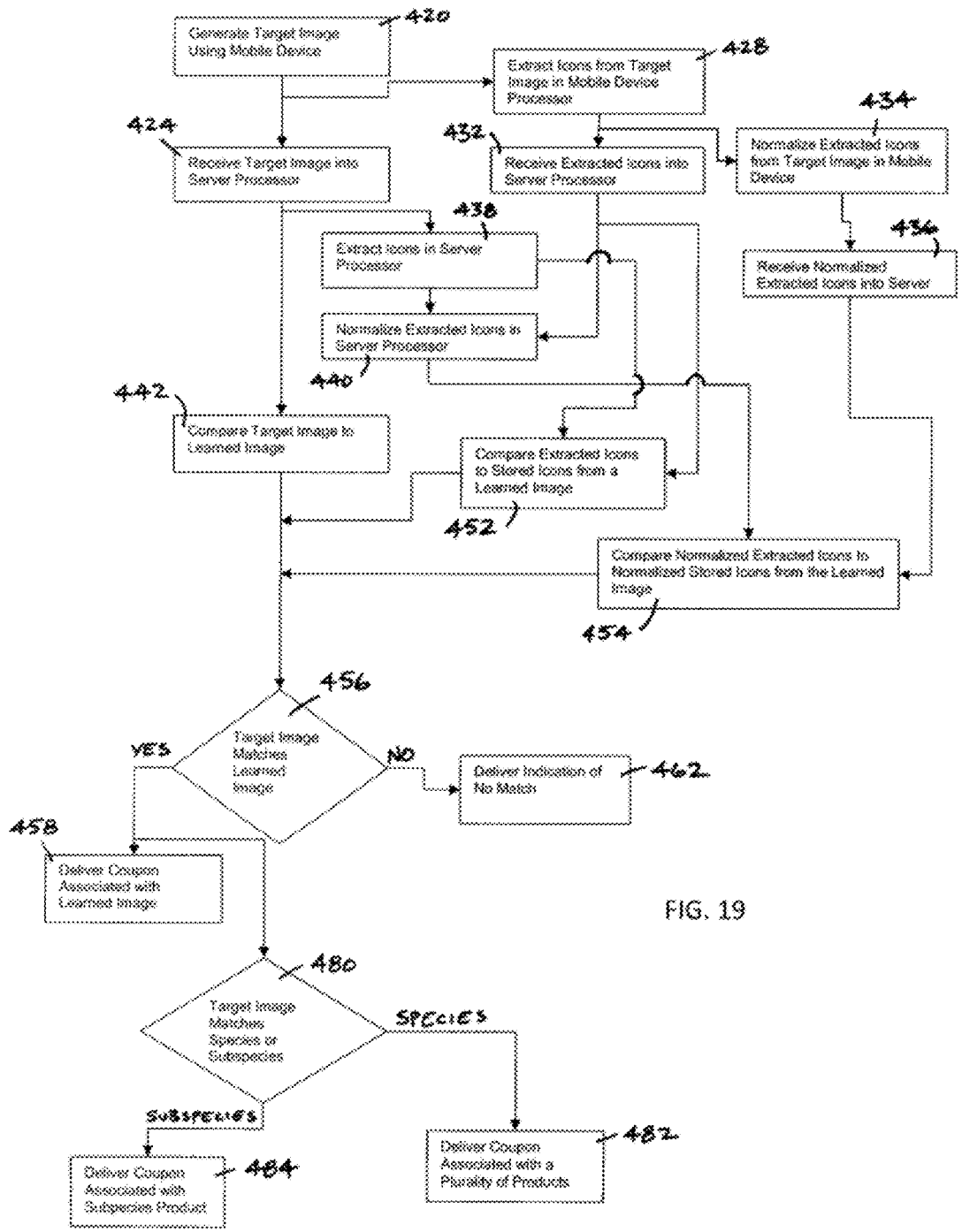
FIG. 19 is a flow diagram depicting a method for delivering an electronic coupon to a mobile device.

With reference to FIG. 19, a method for delivering the electronic coupon 414 (FIG. 17) to the mobile device 402 (FIG. 16) can include, at 420, generating a target image using the mobile device 402. As mentioned above, the mobile device 402 can be a wireless phone that includes a processor 404 and a camera. These mobile devices are conventional. With reference back to FIG. 16, the consumer can point the camera lens 406 at the consumer packaged good 400 of interest and take a picture of the consumer packaged good in a conventional manner to generate the target image. As has been described above, the target image may be in any suitable electronic format (e.g. JPEG, TIFF, PDF, bitmap, etc.).

With reference back to FIG. 16, the consumer can take a picture of a front surface 422 of the consumer packaged good 400 for which the consumer desires a coupon. With reference to the example depicted in FIG. 16, the consumer may desire a coupon for "brand X diapers," and therefore take a picture of the front surface 422 of the consumer packaged good. The front surface 422 is the surface the consumer packaged good 400 that faces the aisle of the retail outlet carrying the consumer packaged good. Instead of searching for the barcode, or some other machine-readable code on the packaged good, the consumer can take a picture of the front surface 422 of the consumer packaged good without having to manipulate or handle the consumer packaged good in search of some machine-readable code. The method for delivering an electronic coupon can use an image of the front surface to locate an appropriate coupon for the consumer packaged good 400 (or some other good of interest, which will be described in more detail below).

Figure 16:
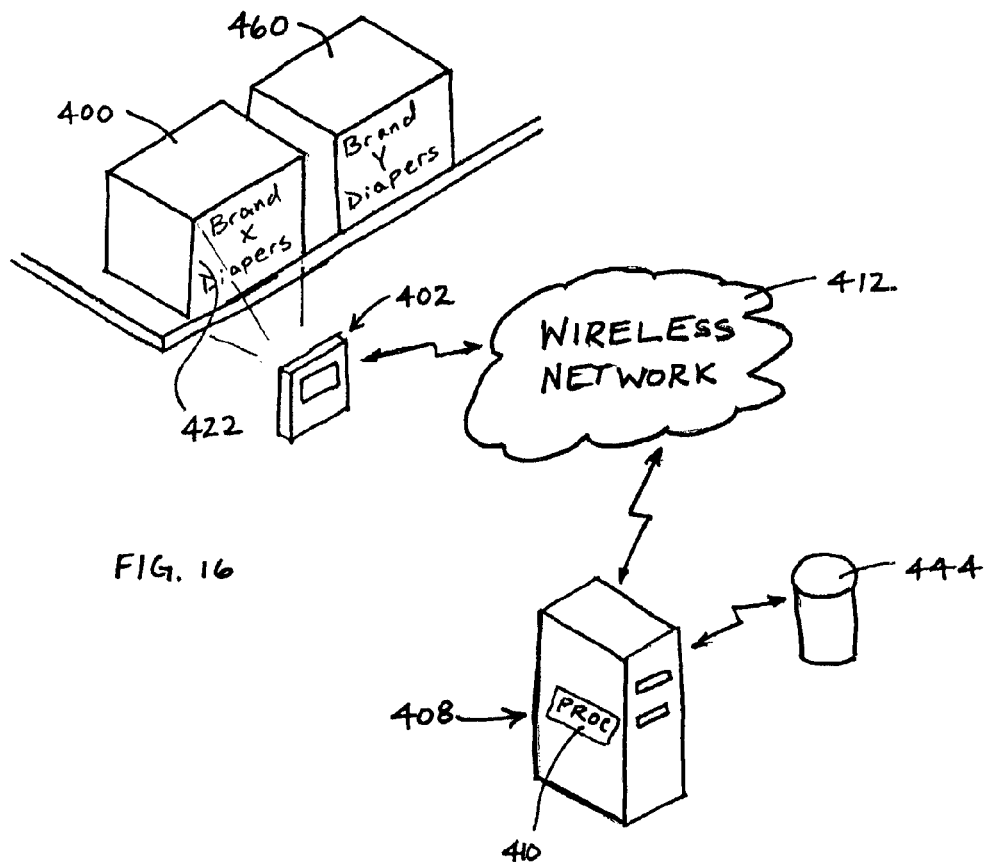
FIG. 16 is a schematic depiction of a system for delivering an electronic coupon.
Figure 17:
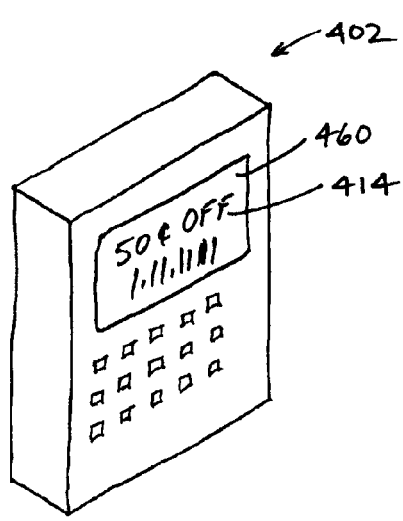
FIG. 17 is a perspective view of a mobile device, which makes up a component of the system for delivering an electronic coupon depicted in FIG. 16.

The method for delivering an electronic coupon to a mobile device can further include receiving via the wireless network 412 (FIG. 16) the target image or icons extracted from the target image. With reference back to FIG. 19 for example, the target image that was generated by the mobile device 402 (FIG. 16) can be received, at 424, into the server processor 410 (FIG. 16) via the wireless network 412 (FIG. 16). The server 408 can be any conventional type of server that includes at least one processor, e.g. the processor 410, and software and/or hardware configured to perform operations, such as those that will be described in more detail below. The mobile device 402 can include software or an application that prompts the consumer with a query such as, "Do you want a coupon for this product?" after the consumer has photographed the consumer packaged good. If the consumer responds "yes" to this query, then the target image or icons extracted from the target image (described below) can be sent to the server processor 410.

Instead of receiving the target image directly into the server 408 (FIG. 16), the mobile device 402 (FIG. 16) can be equipped with software on the mobile device processor 404 (FIG. 16) that can allow the mobile device to perform operations on the target image prior to sending information over the wireless network 412 to the server 408. For example, at 428, icons can be extracted from the target image using the mobile device processor 404. Extracting icons from a target image has been described in detail above. To briefly reiterate, extracting icons can include cross-correlating the target image with a structure having a variety of scales across the image. Extracting the icons can further include computing an angle of the icon from a vector between a unique point position of the extracted icon and a gray scale centroid position of the extracted icon at a scale. At 432, these extracted icons can be received into the server processor 410, e.g. the extracted icons (as opposed to the entire target image) can be sent from the mobile device 402 (FIG. 16) to the server 408 (FIG. 16) via the wireless network 412 (FIG. 16). Alternatively, the mobile device 402 can include software on the processor 404 that allows for normalizing extracted icons from the target image on the mobile device processor 404, which is shown in FIG. 19 at 434. Normalizing extracted icons was described above in detail. To briefly reiterate, the extracted icons are scaled to be all the same size (see FIG. 5). With reference back to FIG. 16, where the icons are normalized in the mobile device 402 (FIG. 16), these normalized icons can be received in the server processor 410 (FIG. 16) at 436, e.g. the normalized extracted icons (as opposed to the entire target image or only the extracted icons) can be sent from the mobile device 402 to the server 408 via the wireless network 412.

As mentioned above, the method for delivering the electronic coupon 414 to the mobile device 402 can include receiving via the wireless network 412 a target image or icons extracted from the target image. Where the target image is received into the server processor (step 424 in FIG. 19), at 438 icons can be extracted from the target image in the server processor 410 (FIG. 16). Extracting icons from the image has been described in detail above. At 440, the extracted icons can be normalized in the server processor. Also, received extracted icons from the mobile device 402, which were received at 432, can also be normalized in the server processor 410 (FIG. 16) at 440.

The method for delivering the electronic coupon 414 (FIG. 16) to a mobile device 402 (FIG. 16) can further include, at 442, comparing the target image to a plurality of learned images. The purpose of comparing the target image to a plurality of learned images is to determine whether the target image, which is an image of a consumer packaged good that is of interest to a consumer (e.g. an image of a product for which the consumer desires a coupon), matches an images, which are stored in a memory, or database 444, that is in communication with the server 408 to deliver an appropriate electronic coupon to the consumer. A method for learning an object has been described above with reference to FIG. 11. With regard to the method for delivering the electronic coupons 414 to the mobile device 402, the learned images can each represent an object that corresponds to at least a portion of a front surface of a consumer packaged good that is offered for sale. In other words, a plurality of images of consumer packaged goods can be loaded into the database 444. If the target image matches a learned image, then the appropriate coupon for the learned image can be delivered to the consumer's mobile device.

Figure 20:
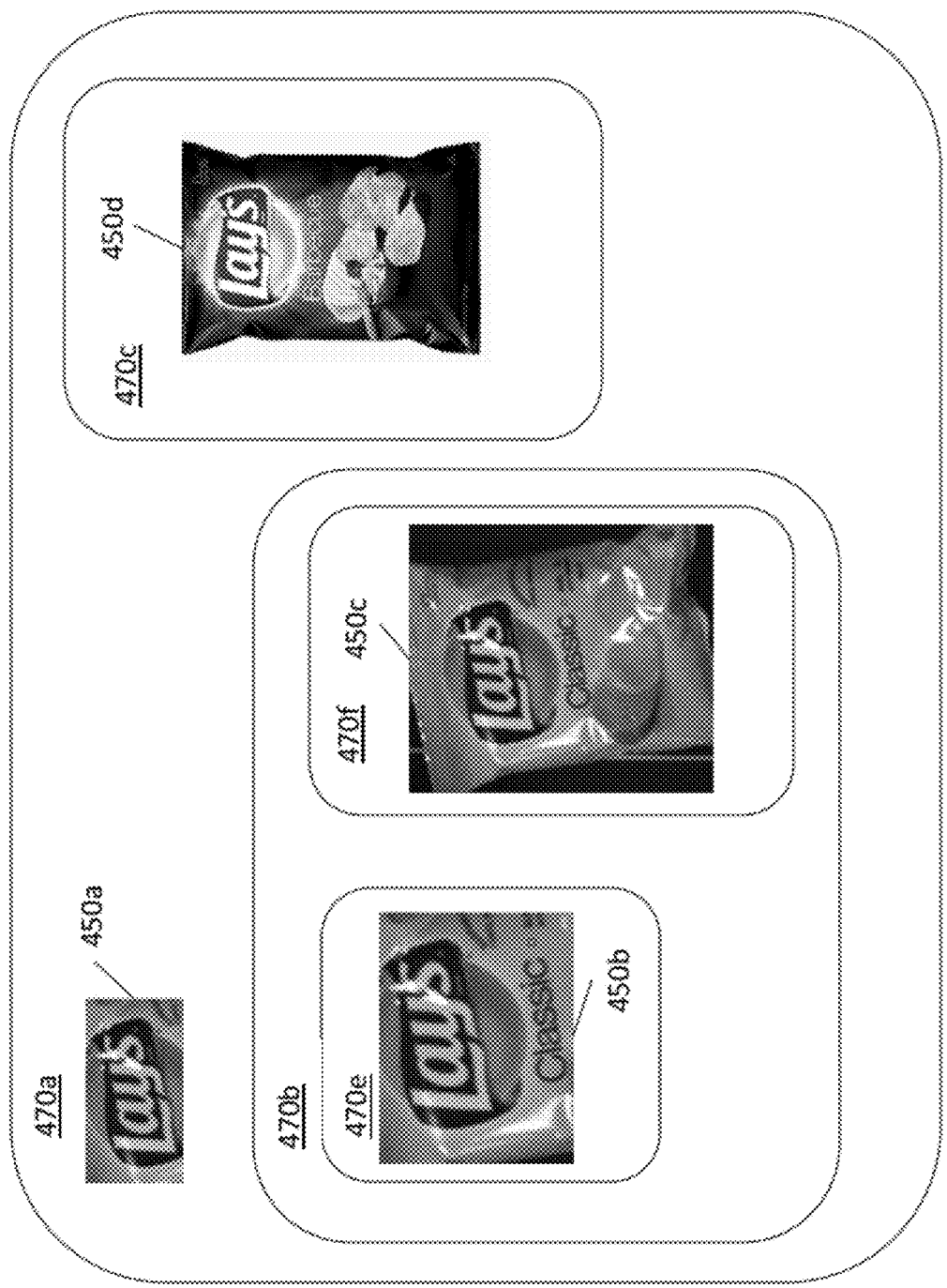
FIG. 20 is a schematic depiction of a plurality of learned images stored in a database.

For example, with reference to FIG. 20, four different learned images 450a, 450b, 450c, and 450d, which can be stored in the database 444 (FIG. 16) are depicted. Each learned image 450a, 450b, 450c, and 450d represents at least a portion of a front surface, i.e. the surface typically facing the aisle in a retail store, of a consumer packaged good. FIG. 20 only shows four images; however, hundreds, thousands, or millions of similar images can be provided in a library warehoused in the memory 444 (FIG. 16). Moreover, as described above, when learning an object, the system can generate a plurality of highly stable and invariant icons that represent the learned object (see step 164 in FIG. 11). Accordingly, in addition to, or in lieu of, the learned images 450a, 450b, 450c, and 450d shown in FIG. 20, icons associated with each learned image (similar to the normalized icons depicted in FIG. 5) or descriptor vectors, similar to the descriptor vectors described above, can be stored in the memory 444.

With reference back to FIG. 19, comparing the target image to a plurality of learned images can include, at 452, comparing extracted icons from the target image to stored icons from the learned images. Also, comparing the target image to the learned images can include, at 454, comparing normalized extracted icons from the target image to normalized stored icons from the learned image at 454. Comparing icons from the target image to icons from the learned image has been described above, which was referred to as a recognition phase. To briefly reiterate, the target image is provided in electronic form, contour points and SRI points are extracted from the target image, icons are extracted at each of the unique points and normalized. For each normalized extracted icon from the target image, a best matched stored icon from the learned images is searched for in the database of icons using either a sequential method (for example, if number of learned images is small) or an indexing method (for example, if the number of learned objects is large). Candidate objects in the target image are then identified and ranked based on the quality of the match and/or the number of matches. The location of the target image is determined and, based on the stored icon or icons of a learned image, corresponding icons in the extracted icons are found, which may be accomplished by a variety of methods (described above with reference to FIG. 13).

With reference back to FIG. 19, the method for delivering the electronic coupon 414 (FIG. 16) to the mobile device 402 (FIG. 16) further includes, at 456, determining whether the target image matches at least one learned image. When it is determined that the target image matches at least one learned image, then, at 458, the server 408 (FIG. 16) can deliver the electronic coupon 414 (FIG. 17) associated with the learned image. The electronic coupon 414 can be displayed on a display 460 (FIG. 17) of the mobile device 402 and can include a bar code that can be read by a point of sale system or scanner located in a retail outlet.

With reference back to FIG. 16, for example, where the mobile device 402 captures an image associated with the front surface 422 of the consumer packaged good 400, which is depicted as a box of "brand X diapers," if this target image matches a learned image in the memory 444 then the server 408 can deliver via the wireless network 412 a coupon relevant to brand X diapers. Accordingly, the electronic coupon 414 (FIG. 17) could be associated with a producer or a distributor of the consumer packaged good, e.g. the electronic coupon can be associated with the manufacturer of brand X diapers. Also, the electronic coupon 414 can be associated with a competitor of a producer or a competitor of a distributor of the consumer packaged good that is the subject of the target image. For the example depicted in FIG. 16, where the target image represents the front surface 422 of the consumer packaged good 400, which is "brand X diapers," the system, and more particularly the server 408, can be programmed to deliver a coupon for brand Y diapers, which can be a consumer packaged good 460 that is a competitor of the manufacturer or distributor of brand X diapers. Also, the server 408 can be programmed to deliver coupons for complementary products that are related to the subject of the target image. For example, where the mobile device 402 captures an image of brand X diapers, other complementary products manufactured by the company that manufacturers brand X diapers, such products could include baby wipes, baby shampoo, baby cleaning products, and the like, can also be delivered to the mobile device 402. These can all be considered as coupons associated with the learned image.

With reference back to FIG. 19, where the target image does not match any learned images in the database 444 (FIG. 16), at 462 the method for delivering the electronic coupon 414 to the mobile device 402 can deliver an indication of no match. In other words, the server 408 can be programmed to deliver a message over the wireless network 412 to the mobile device 402 indicating that no coupons match the request.

With reference to FIG. 20, the learned images within the database 444 (FIG. 16) can be classified. In the example depicted in FIG. 20, the learned images 450a, 450b, 450c and 450d are classified in classifications or indexes, which are herein referred to as species and subspecies. Learned image 450a represents a house brand, which can be found on a number of different consumer packaged goods that are offered by a manufacturer. Learned image 450b represents a larger portion of a front surface of a consumer packaged good and includes the house brand along with another marking, e.g. the marking "classic" which in this instance refers to a style of potato chips. Learned image 450c represents yet a larger portion of a front surface (nearly the entire front surface of the consumer packaged good is depicted by learned image 450c) of a consumer packaged good and includes the house brand, the "classic" marking and other indicia which differentiates this image from learned images 450a and 450b. Learned image 450d represents an entire portion of a front surface of a consumer packaged good and includes the house brand, however, learned image 450d represents "barbeque" style chips. As should be understood, the learned images shown in FIG. 20 are for illustrative purposes only. Many more learned images, or the data associated with the learned images (e.g. icons and descriptor vectors) are provided in the database 444.

FIG. 20 also depicts a species 470a that is associated with a house brand for consumer products emanating from a manufacturer. Since each of the learned images 450a, 450b, 450c and 450d includes the same house brand in the respective image, each of these images can be classified within the species 470a. Subspecies 470b and 470c can be classified within species 470a. Subspecies 470b can be used to classify learned images 450b and 450c, since each of these images includes the marking "classic" along with the house brand. Subspecies 470c can be used to classify learned image 450d since this learned image includes the house brand; however, subspecies 470d is distinct from subspecies 470b, since the images in subspecies 470b include the marking "classic" while the image in subspecies 470c includes the marking "barbeque" and not the marking "classic." Subspecies images 450b can depict a type of product manufactured by the manufacturer of the house brand depicted in image 450a. For example, learned image 450b depicts a type of potato chips, more particularly "classic" potato chips, but is not limited to size while image 450c also depicts "classic" style potato chips, but may limited to the size of the bag of potato chips (due to the other markings found on the learned image 450c). Subspecies 470e, which classifies learned image 450b, and subspecies 470f, which classifies learned image 450c, can be classified within subspecies 470b. As should be understood, the species and subspecies shown in FIG. 20 are for illustrative purposes only. Many more species and subspecies (e.g. species for different types of consumer goods) are provided in the database 444.

With reference back to FIG. 19, the method for delivering the electronic coupon 414 (FIG. 16) to the mobile device 402 (FIG. 16) can further include, at 480, determining whether the target image matches a species or subspecies. Where the target image generated by the mobile device 402 (FIG. 16) only captures the house brand (e.g. an image similar to learned image 450a), the target image can be found to match a species image, e.g. the species image 450a depicted in FIG. 20. In this instance, at 482, a plurality of coupons can be delivered to mobile device 402, e.g. a coupon for "classic" style potato chips and/or a coupon for "barbeque" style potato chips. Alternatively, if it is determined, at 480, that the target image generated by the mobile device 402 matches a species image, e.g. species image 450c or 450d, then at 484 an electronic coupon associated with a single product, e.g. "classic" style potato chips or "barbeque" style potato chips can be delivered to the mobile device 402.

A method for delivering an electronic coupon to a mobile device has been described in detail above. The method does not rely on the consumer to manipulate the consumer package in order to find the barcode, or other machine-readable code, associated with the consumer product. Instead, the consumer can snap a picture of the surface of the product that typically faces the consumer to see if any relevant offers associated with the produce are available. Recognition software housed in the server that is in communication with the mobile device over a wireless network can operate to recognize the image delivered to it from the consumer and can deliver relevant coupons associated with the product that is of interest to the consumer. Such a method is an advance over the known art. Nevertheless, modifications and alterations may occur to those who are skilled in the art upon reading and understanding the preceding detailed description. The invention, however, is not limited to only the embodiments described above. Instead, the invention is broadly defined by the appended claims and the equivalents thereof.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". It should also be noted that although the specification lists method steps occurring in a particular order, these steps may be executed in any order, or at the same time.

What is claimed is:

1. A method for delivering an electronic coupon to a mobile device, the method comprising:
    extracting unique points from a target image, wherein the unique points are generated from extremum information obtained from the target image by cross-correlating at least one structure across the target image, wherein the target image represents a consumer packaged good and is generated by a mobile device configured to communicate with a wireless network;
    extracting an icon of the target image corresponding to each of the unique points;
    comparing the extracted icon to a stored icon corresponding to a learned image, wherein the stored icon is stored in a memory in electrical communication with the wireless network;
    determining whether the target image matches the learned image based on comparing the extracted icon to the stored icon; and
    delivering to the mobile device over the wireless network an electronic coupon associated with the learned image when the target image matches the learned image.

2. The method of claim 1, wherein extracting the icon is performed on a processor in the mobile device.

3. The method of claim 2, further comprising sending the extracted icon over the wireless network to a server in communication with the wireless network and the memory, wherein the extracted icon is described in a descriptor vector format.

4. The method of claim 1, further comprising receiving the target image from the mobile device over the wireless network, wherein extracting the icon is performed on a server in communication with the network.

5. The method of claim 1, wherein comparing the extracted icon to a stored icon further includes comparing the extracted icon to a stored icon corresponding to a plurality of learned images.

6. The method of claim 5, wherein delivering to the mobile device over the network an electronic coupon includes delivering a plurality of electronic coupons associated with a species of images, wherein the species of images includes more than one subspecies image.

7. The method of claim 5, wherein delivering to the mobile device over the network an electronic coupon includes delivering a single electronic coupon associated with a subspecies image classified within a species of images.

8. The method of claim 1, wherein delivering to the mobile device over the network an electronic coupon includes delivering an electronic coupon associated with a producer or a distributor of the consumer packaged good when the extracted icon matches the stored icon.

9. The method of claim 1, wherein delivering to the mobile device over the network an electronic coupon includes delivering an electronic coupon associated with a competitor of a producer or a competitor of a distributor of the consumer packaged good when the extracted icon matches the stored icon.

10. The method of claim 1, wherein the target image of the consumer packaged good corresponds to a front surface of the consumer packaged good, wherein the front surface faces an aisle of a retail store that sells the consumer packaged good.

11. The method of claim 10, wherein the learned image corresponds to the front surface of a consumer packaged good that is to be offered for sale.

12. The method of claim 1, further comprising normalizing the extracted icon to a predetermined size to generate a normalized extracted icon.

13. The method of claim 12, wherein comparing the extracted icon to a stored icon includes comparing the normalized extracted icon with a normalized stored icon corresponding to the learned image.

14. The method of claim 13, wherein determining whether the target image matches the learned image includes using a least square correlation method to generate a perspective transform between a unique point position of the normalized stored icon and the unique point position of the normalized extracted icon.

15. The method of claim 1, wherein determining whether the target image matches the learned image includes superimposing the stored icon on the target image to determine a match score.

16. A method for delivering an electronic coupon to a mobile device, the method comprising:
    extracting an icon from a target image of a consumer packaged good where the target image is generated by a mobile device configured to communicate with a wireless network;
    comparing the extracted icon to a stored icon corresponding to a learned image, wherein the stored icon is stored in a memory in electrical communication with the wireless network;
    determining whether the target image matches the learned image based on comparing the extracted icon to the stored icon; and
    delivering to the mobile device over the wireless network an electronic coupon associated with the learned image when the target image matches the learned image,
    wherein extracting the icon includes cross-correlating the target image with a structure having a variety of scales across the image,
    wherein extracting the icon further includes computing an angle of the extracted icon from a vector between a unique point position of the extracted icon and a grayscale centroid position of the extracted icon at a scale.

* * * * *